United States Patent
Holtmanns et al.

(10) Patent No.: US 9,467,285 B2
(45) Date of Patent: Oct. 11, 2016

(54) SECURITY OF A MULTIMEDIA STREAM

(75) Inventors: Silke Holtmanns, Klaukkala (FI); Pekka Johannes Laitinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 87 days.

(21) Appl. No.: 12/876,814

(22) Filed: Sep. 7, 2010

(65) Prior Publication Data

US 2012/0057697 A1 Mar. 8, 2012

(51) Int. Cl.
*H04L 9/18* (2006.01)
*H04L 9/08* (2006.01)
*H04L 29/06* (2006.01)
*H04N 21/2347* (2011.01)
*H04N 21/266* (2011.01)
*H04N 21/414* (2011.01)
*H04N 21/63* (2011.01)
*H04N 21/6405* (2011.01)

(Continued)

(52) U.S. Cl.
CPC ........... *H04L 9/0861* (2013.01); *H04L 9/0838* (2013.01); *H04L 63/061* (2013.01); *H04L 65/1076* (2013.01); *H04L 65/4076* (2013.01); *H04L 67/1074* (2013.01); *H04N 21/2347* (2013.01); *H04N 21/26613* (2013.01); *H04N 21/41407* (2013.01); *H04N 21/632* (2013.01); *H04N 21/6405* (2013.01); *H04N 21/6543* (2013.01); *H04L 2209/601* (2013.01); *H04L 2463/062* (2013.01)

(58) Field of Classification Search
CPC ............... H04N 21/4104; H04N 21/4126; H04N 21/2347; H04N 21/26613; H04N 21/41407; H04N 21/632; H04N 21/6405; H04N 21/6543; H04W 4/006; H04W 84/18; H04W 84/20; H04W 12/06; H04W 12/08; H04W 12/10; H04L 9/0861; H04L 9/0838; H04L 9/00; H04L 9/28; H04L 63/061; H04L 63/04; H04L 63/0428; H04L 65/1076; H04L 65/4076; H04L 67/1074; H04L 2209/601; H04L 2463/062
USPC ........................................................ 380/255
See application file for complete search history.

(56) References Cited

U.S. PATENT DOCUMENTS 6,266,481 B1 * 7/2001 Lee et al. ........................ 386/259
7,127,613 B2 * 10/2006 Pabla et al. .................... 713/171

(Continued)

FOREIGN PATENT DOCUMENTS

WO WO2008155713 12/2008

OTHER PUBLICATIONS

International Search Report of International Application No. PCT/FI2011/050686—Date of Completion of Search: Nov. 2, 2011, 4 pages.

(Continued)

*Primary Examiner* — William Goodchild
(74) *Attorney, Agent, or Firm* — Locke Lord LLP

(57) ABSTRACT

A method including receiving encrypted multimedia information of a multimedia broadcast multicast service streaming session, wherein the multimedia information is encrypted using an encryption key. An indication allowing to switch the receiving of the encrypted multimedia information to a peer-to-peer streaming session is received and receiving of the encrypted multimedia information from the multimedia broadcast multicast service streaming session to the peer-to-peer streaming session is switched. Encrypted multimedia information of the peer-to-peer streaming session is received.

15 Claims, 5 Drawing Sheets

(51) Int. Cl.
*H04N 21/6543* (2011.01)
*H04L 29/08* (2006.01)

(56) References Cited

U.S. PATENT DOCUMENTS

| | | | | |
|---|---|---|---|---|
| 7,961,694 | B1* | 6/2011 | Chan et al. | 370/341 |
| 8,028,159 | B2* | 9/2011 | Li | 713/150 |
| 8,102,813 | B2* | 1/2012 | Abhishek et al. | 370/331 |
| 8,451,801 | B2* | 5/2013 | Isozu et al. | 370/332 |
| 2002/0057799 | A1* | 5/2002 | Kohno | 380/228 |
| 2003/0156558 | A1* | 8/2003 | Cromer et al. | 370/331 |
| 2004/0147223 | A1* | 7/2004 | Cho | 455/41.2 |
| 2004/0236869 | A1* | 11/2004 | Moon | 709/246 |
| 2005/0010774 | A1* | 1/2005 | Rose et al. | 713/171 |
| 2005/0157876 | A1 | 7/2005 | Jeong et al. | |
| 2006/0240766 | A1 | 10/2006 | Wilde | |
| 2007/0073837 | A1* | 3/2007 | Johnson-McCormick et al. | 709/217 |
| 2007/0136476 | A1* | 6/2007 | Rubinstein | 709/227 |
| 2007/0244983 | A1* | 10/2007 | Berger | 709/217 |
| 2008/0133767 | A1* | 6/2008 | Birrer et al. | 709/231 |
| 2008/0155061 | A1* | 6/2008 | Afergan et al. | 709/218 |
| 2009/0187978 | A1* | 7/2009 | Upendran et al. | 726/5 |
| 2009/0208021 | A1 | 8/2009 | Jung et al. | |
| 2009/0210697 | A1* | 8/2009 | Chen et al. | 713/153 |
| 2009/0276803 | A1* | 11/2009 | Weaver | 725/32 |
| 2009/0316615 | A1 | 12/2009 | Vedantham et al. | |
| 2010/0002695 | A1 | 1/2010 | Cheung | |
| 2010/0094972 | A1* | 4/2010 | Zuckerman et al. | 709/219 |

OTHER PUBLICATIONS

Written Opinion of the International Searching Authority of International Application No. PCT/FI2011/050686—Date of Completion of Opinion: Nov. 2, 2011, 6 pages.

* cited by examiner

SECURITY OF A MULTIMEDIA STREAM

TECHNICAL FIELD

The present invention generally relates to security of the multimedia broadcast/multicast service (MBMS). The invention relates particularly, though not exclusively, to the key management for streaming and multicast to allow and enable content rendering and peer-to-peer content distribution of the multimedia broadcast/multicast service (MBMS).

BACKGROUND ART

Mobile broadcast solutions have been standardized by different organizations, such as the 3rd generation partnership project (3GPP) multimedia broadcast/multicast service (MBMS). 3GPP multimedia broadcast/multicast service (MBMS) enables resource-efficient delivery of multimedia content to the mobile users. A multimedia broadcast/multicast service (MBMS) client can receive content via download delivery, streaming delivery, a combination of streaming delivery and download delivery, and/or other delivery methods.

Multimedia broadcast/multicast service (MBMS) is a 3GPP Release 6 (Rel-6) feature, which may be deployed by network operators where it is cost efficient to have the broadcast/multicast distribution of content. When multimedia broadcast/multicast service (MBMS) subscribers move to other areas, where there is no multimedia broadcast/multicast service (MBMS) coverage, the network operator may distribute the multimedia broadcast/multicast service (MBMS) content in a unicast mode.

In the multimedia broadcast/multicast service (MBMS), there are two different modes of operation: Multicast mode, which comprises the following main phases of subscription: subscription, service announcement, joining, session start, MBMS notification, data transfer, session stop and leaving. Subscription establishes a relationship between the user and the service provider to allow the user to receive the related multimedia broadcast/multicast service (MBMS). The service announcement subsequently informs users about the available multimedia broadcast/multicast service (MBMS) user services. On joining, a subscriber indicates to the network that he or she desires to receive multicast mode data of a particular multimedia broadcast/multicast service (MBMS) bearer service. Next, the session start triggers for bearer resource establishment for multimedia broadcast/multicast service (MBMS) data transfer and after that the MBMS notification informs the user of available multimedia broadcast/multicast service (MBMS) multicast data transfer, which then occurs in the data transfer phase. Finally, when no more data has been sent for a set period, the session stops and the bearer resources are released. The subscriber may leave or deactivate the multimedia broadcast/multicast service (MBMS) multicast service when no more multicast mode service is desired. The user, the service provider or both may be charged for the multicast mode service. In the broadcast mode, in comparison to the multicast mode, the operation is otherwise similar but the joining and leaving are not needed. Correspondingly, the broadcast service is likely to be charged from the service provider only.

Multimedia broadcast/multicast service (MBMS) introduces the concept of a point-to-multipoint service into a 3GPP system. A requirement of a multimedia broadcast/multicast service (MBMS) user service is to be able to securely transmit data to a given set of users. In order to achieve this, there needs to be a method of authentication, key distribution and data protection for a multimedia broadcast/multicast service (MBMS) user service. This means that multimedia broadcast/multicast service (MBMS) security is specified to protect multimedia broadcast/multicast service (MBMS) user services, and it is independent on whether multicast or broadcast mode is used.

With the explosive growth of media content consumption, the number of media servers to provide streaming services is required to be increased almost linearly with the number of users. In addition, centralized streaming media servers require considerable demands towards the bandwidth of the backbone IP network. So it is required to deploy more and more edge servers close to user equipments (UE) to guarantee service quality with the increasing number of users.

Peer-to-peer (P2P) technology can be used between edge servers and user equipments (UE) to relieve the above problem. Not only the edge servers handle the requests from its locally served user equipments (UE), but also they can handle the requests transferred from the neighboring edge servers. Similarly, if the user equipment's (UE) capabilities permit, the user equipment (UE) can offer spare uplink bandwidth and storage space while obtaining data, and uploads data to other requested destinations. Content is transmitted in a segmented manner, and most of the traffic can be spread across the edge of the network, which helps reduce the storage and bandwidth demands of centralized servers. Therefore, the system capability is improved along with the increasing number of edge servers and user equipments (UE).

SUMMARY

According to a first example aspect of the invention there is provided a method comprising:
  receiving an encrypted multimedia data of multimedia broadcast multicast service streaming session, wherein the multimedia data is encrypted using an encryption key;
  receiving an indication allowing to switch the receiving of the encrypted multimedia data to a peer-to-peer streaming session;
  switching receiving the encrypted multimedia data from multimedia broadcast multicast service streaming session to the peer-to-peer streaming session; and
  receiving an encrypted multimedia data of the peer-to-peer streaming session.

In an example embodiment, the method comprises receiving a protected service key and the encryption key, wherein the encryption key is protected by the service key before switching of the receiving of the encrypted multimedia information from multimedia broadcast multicast service streaming session to the peer-to-peer streaming session.

In an example embodiment, the method comprises decrypting the multimedia information using the encryption key.

In an example embodiment, the method comprises generating a user key, unprotecting the protected service key using the user key, unprotecting the protected encryption key using the unprotected service key and decrypting the multimedia information using the encryption key.

In an example embodiment, the user key is derived from a ciphering key and an integrity key.

In an example embodiment, the switching of the receiving of the encrypted multimedia information from multimedia broadcast multicast service streaming session to the peer-to-peer streaming session is triggered in response to at least one of the following criteria:

losing the broadcast multicast service streaming session; load balancing by mobile network operator.

In an example embodiment, the multimedia information comprises real-time streaming data or file download data.

In an example embodiment, the method comprises determining a lifetime of a time period for the encryption key during which time period the encryption key is valid for data decryption.

In an example embodiment, the method comprises extending the lifetime of the encryption key for the peer-to-peer streaming session.

In an example embodiment, the method comprises switching back from the peer-to-peer streaming session to the multimedia broadcast multicast service streaming session.

According to a second example aspect of the invention there is provided an apparatus comprising:
at least one processor;
at least one memory including computer program code, the at least one memory and the computer program code configured to, with the at least one processor, cause the apparatus at least to perform:
receive encrypted multimedia information of a multimedia broadcast multicast service streaming session, wherein the multimedia information is encrypted using an encryption key;
receive an indication allowing to switch the receiving of the encrypted multimedia information to a peer-to-peer streaming session;
switch receiving of the encrypted multimedia information from the multimedia broadcast multicast service streaming session to the peer-to-peer streaming session; and
receive encrypted multimedia information of the peer-to-peer streaming session.

In an example embodiment, the at least one memory and the computer program code are configured to, with the at least one processor, cause the apparatus to further perform:
receive a service key and the encryption key, wherein the encryption key is protected by the service key before switching of the receiving of the encrypted multimedia information from multimedia broadcast multicast service streaming session to the peer-to-peer streaming session.

In an example embodiment, the at least one memory and the computer program code are configured to, with the at least one processor, cause the apparatus to further perform:
decrypt the multimedia information using the encryption key.

In an example embodiment, the at least one memory and the computer program code are configured to, with the at least one processor, cause the apparatus to further perform:
derive encryption key from the protected encryption key by the service key.

According to a third example aspect of the invention there is provided a computer program embodied on a computer readable medium comprising computer executable program code which, when executed by at least one processor of an apparatus, causes the apparatus to perform:
receive encrypted multimedia information of a multimedia broadcast multicast service streaming session, wherein the multimedia information is encrypted using an encryption key;
receive an indication allowing to switch the receiving of the encrypted multimedia information to a peer-to-peer streaming session;
switch receiving of the encrypted multimedia information from the multimedia broadcast multicast service streaming session to the peer-to-peer streaming session; and
receive encrypted multimedia information of the peer-to-peer streaming session.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
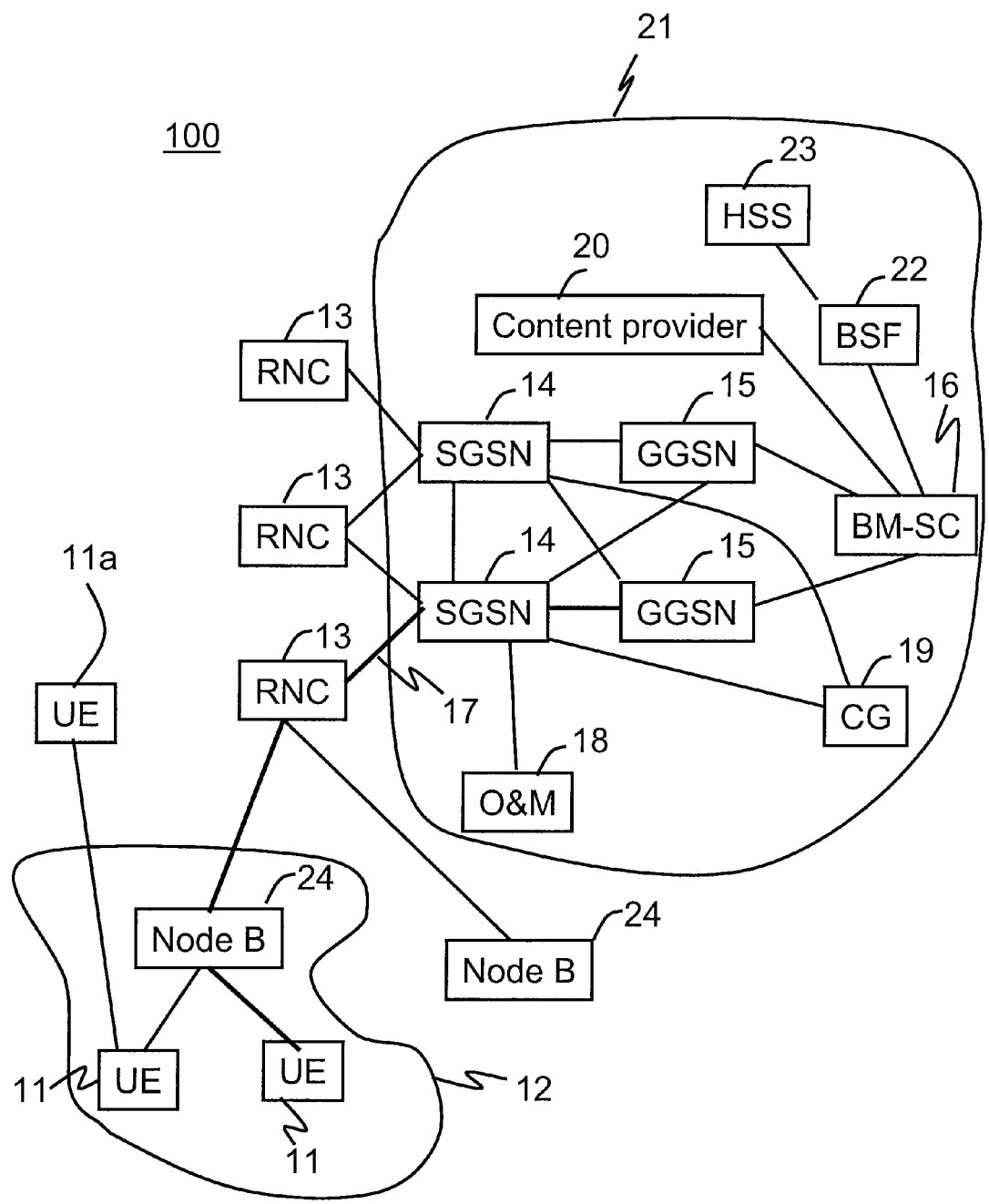
FIG. 1 shows some details of the system architecture.

FIG. 1 shows some details of the system architecture 100. A typical 3GPP radio access system UTRAN (umts terrestrial radio access network) for implementing the multimedia broadcast/multicast service (MBMS) has a basic architecture as is illustrated in FIG. 1. FIG. 1 depicts a plurality of user equipment (UE) 11, within a predetermined service area 12 such as a cell, a plurality of radio network controllers (RNC) 13, a plurality of base stations (Node B) 24, a core network 21, two serving GPRS support nodes (SGSN) 14, two gateway GPRS support nodes (GGSN) 15, a broadcast-multicast service centre (BM-SC) 16, an operation and maintenance (O&M) workstation or server 18, a charging gateway (CG) 19, a generic bootstrapping server function (BSF) 22 and a content provider or multicast broadcast source 20. As can be seen in FIG. 1, one user equipment (UE) 11a is located outside the service area 12 without connection to the radio network controller 13. However, such user equipment (UE) 11a may be connected to other user equipment (UE) 11 over peer-to-peer (P2P) connection. Peer-to-peer (P2P) connections may also be established between user equipments (UE) 11 that are connected to the radio network controller (RNC) 13.

The user equipments (UE) 11 may move in and out of a network service area offering good service coverage. When the user equipment (UE) 11 moves to the edge of the network service area 12, the moving out may be prepared by the user equipment (UE) 11 and network. When moving out of the service area 12, the user equipment (UE) 11 may provide service information to other user equipments (UE) 11 and request service information from other user equipments (UE) 11.

On delivering multimedia broadcast/multicast service (MBMS) transmissions to numerous user equipments (UE) 11, only one packet data protocol (PDP) context is established as a prerequisite for a packet data transmission connection 17 between a gateway GPRS support nodes (GGSN) 15 and user equipment (UE) 11 via a serving GPRS support node (SGSN) 14. A single, common context suffices for transmission of data within a core network thanks to the point-to-multipoint approach.

A generic bootstrapping server function (BSF) 22 and the user equipment (UE) 11 shall mutually authenticate using the authentication and key agreement (AKA) protocol, and agree on session keys that are afterwards applied between user equipment (UE) 11 and a network application function (NAF). The network application function (NAF) is a functional module located in the broadcast-multicast service centre (BM-SC) 16. Alternatively, if a legacy smart card is involved, transport layer security (TLS) and legacy authentication is used. Generic bootstrapping architecture (GBA) may also utilize other authentication mechanism, like hypertext transfer protocol (HTTP) digest or session initiation protocol (SIP) digest. Main functions of the network application function (NAF) module are service/user management (e.g., service subscription and unsubscription) and service key management (e.g., service key generation and delivery). The bootstrapping server function (BSF) 22 shall restrict the applicability of the key material to a specific network application function (NAF) by using a key derivation procedure. The key derivation procedure may be used with multiple network application functions (NAF) during the lifetime of the key material. The lifetime of the key material is set according to the local policy of the bootstrapping server function (BSF) 22. The bootstrapping server function (BSF) 22 is allowed to fetch any required authentication information, security information and subscriber profile information from a home subscriber system (HSS) 23. In legacy networks the bootstrapping server function (BSF) 22 may interact with the home location register (HLR) instead of the home subscriber system (HSS) 23.

Figure 2A:
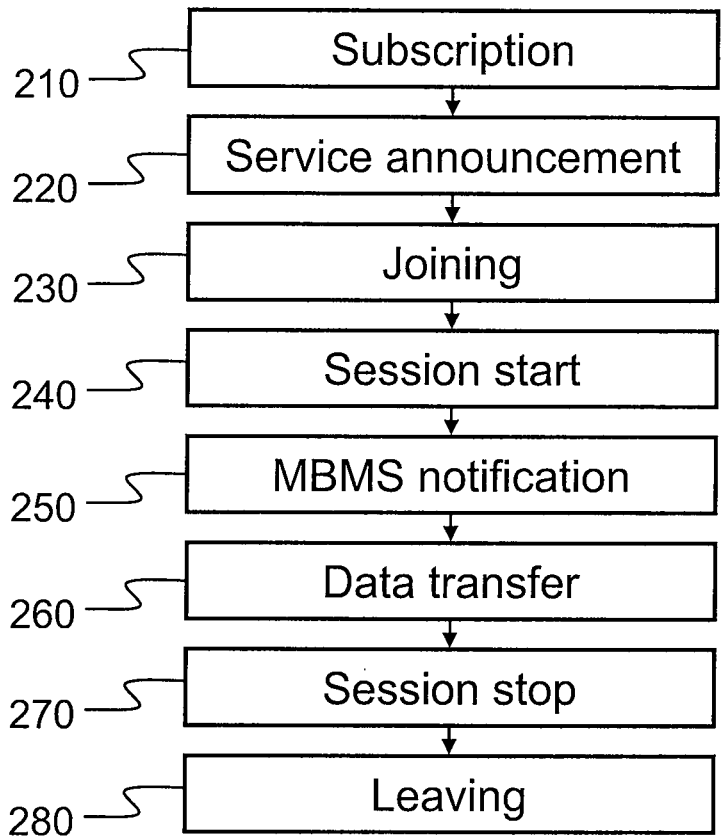
FIG. 2a shows different phases of the multimedia broadcast/multicast service (MBMS) multicast provision.

FIG. 2a shows different phases 210 to 280 of the multimedia broadcast/multicast service (MBMS) multicast provision. The phases subscription 210, joining 220 and leaving 280 may be performed individually per user. The other phases may be performed for a service and thus for all users interested in the related service. The sequence of phases may repeat, depending for example on the need to transfer data. In addition, subscription 210, joining 230, leaving 280, service announcement 220 as well as multimedia broadcast/multicast service (MBMS) notification 250 may run in parallel to other phases or in different order. For example, service subscription 210 may be done anytime before or after service announcement 220.

Subscription 210 establishes a relationship between a user and a service provider, which allows the user to receive the related multimedia broadcast/multicast service (MBMS). Service subscription 210 is the agreement of the user to receive service(s) offered by the operator. Subscription information is recorded in the broadcast-multicast service centre (BM-SC) 16, which may act as a network application function (NAF) in generic bootstrapping architecture (GBA).

Subscription information and other broadcast-multicast service centre (BM-SC) 16 functionality may be on separate entities. Service announcement 220 may allow users to request or be informed about the range of multimedia broadcast/multicast service (MBMS) user services available. This includes operator specific multimedia broadcast/multicast service (MBMS) user services as well as services from content providers outside of the operator network. Service announcement 220 is used to distribute to users information about the service, parameters required for service activation (e.g. IP multicast address(es)) and possibly other service related parameters (e.g. service start time).

Joining 230 (i.e. multimedia broadcast/multicast service (MBMS) multicast activation by the user) is the process by which a subscriber joins (becomes a member of) a multicast group, i.e. the user indicates to the network that he/she wants to receive multicast mode data of a specific multimedia broadcast/multicast service (MBMS) bearer service. A multimedia broadcast/multicast service (MBMS) user service may also be carried by more than one multimedia broadcast/multicast service (MBMS) bearer service. In that case, the multimedia broadcast/multicast service (MBMS) user service part in the user equipment (UE) 11 initiates the relevant multimedia broadcast/multicast service (MBMS) bearer services to receive the service. Session start 240 is the point at which the broadcast-multicast service centre (BM-SC) 16 is ready to send data. Session start 240 occurs independently of activation of the service by the user. Certain user may activate the service before or after session start 240. Session start 240 is the trigger for bearer resource establishment for multimedia broadcast/multicast service (MBMS) data transfer. If a multimedia broadcast/multicast service (MBMS) user service is carried by more than one multimedia broadcast/multicast service (MBMS) bearer service, a session start message 240 is sent for each multimedia broadcast/multicast service (MBMS) bearer service. In that case, the user equipment (UE) 11 may need to initiate the reception of multiple relevant multimedia broadcast/multicast service (MBMS) bearer services to receive the multimedia broadcast/multicast service (MBMS) user service.

MBMS notification 250 informs the user equipments (UE) 11 about forthcoming (and potentially about ongoing) multimedia broadcast/multicast service (MBMS) multicast data transfer. Data transfer 260 is a phase when multimedia broadcast/multicast service (MBMS) data is transferred to the user equipment (UE) 11. Session stop 270 is the point at which the broadcast-multicast service centre (BM-SC) 16 determines that there will be no more data to send for some period of time. This period is long enough to justify removal of bearer resources associated with the session. At session stop 270, the bearer resources are released. Leaving 280 (i.e. multimedia broadcast/multicast service (MBMS) multicast deactivation by the user) is the process by which a subscriber leaves (stops being a member of) a multicast group, i.e. the user no longer wants to receive multicast mode data of a specific multimedia broadcast/multicast service (MBMS) bearer service.

Figure 2B:
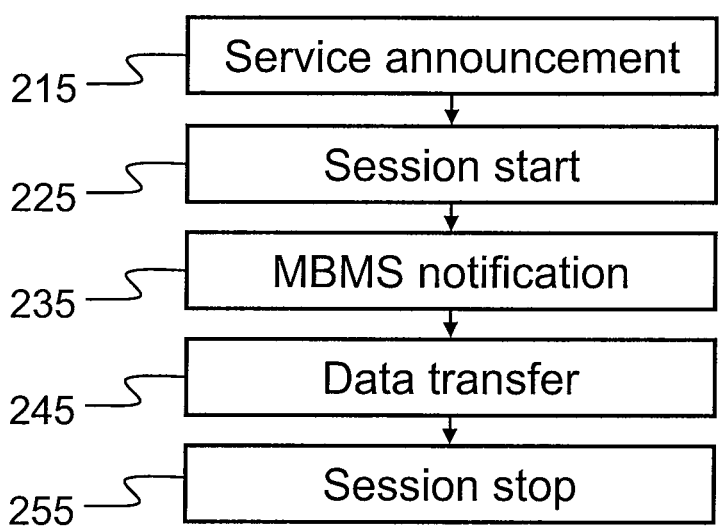
FIG. 2b shows different phases of the multimedia broadcast/multicast service (MBMS) broadcast provision.

FIG. 2b shows different phases 215 to 255 of the multimedia broadcast/multicast service (MBMS) broadcast provision. The sequence of phases 215 to 255 may repeat, e.g. depending on the need to transfer data. It is also possible that the service announcement 215 and MBMS notification 235 phase may run in parallel with other phases, in order to inform user equipments (UE) 11, which have not yet received the related service. Service announcement 215 informs user equipments (UE) 11 about forthcoming multimedia broadcast/multicast service (MBMS) user services. The multimedia broadcast/multicast service (MBMS) user service part in the user equipment (UE) 11 initiates reception of the multimedia broadcast/multicast service (MBMS) bearer service to receive a multimedia broadcast/multicast service (MBMS) user service. In case one multimedia broadcast/multicast service (MBMS) user service is carried by more than one multimedia broadcast/multicast service (MBMS) bearer service, the user equipment (UE) 11 may need to initiate the reception of multiple relevant multimedia broadcast/multicast service (MBMS) bearer services to receive the multimedia broadcast/multicast service (MBMS) user service. Session start 225 is the point at which the broadcast-multicast service centre (BM-SC) 16 is ready to send data. Session start 225 is the trigger for bearer resource establishment for multimedia broadcast/multicast service (MBMS) data transfer. If a multimedia broadcast/multicast service (MBMS) user service is carried by more than one multimedia broadcast/multicast service (MBMS) bearer service, a session start 225 message is sent for each multimedia broadcast/multicast service (MBMS) bearer service. In that case, the user equipment (UE) 11 may need to initiate the reception of multiple relevant multimedia broadcast/multicast service (MBMS) bearer services to receive the multimedia broadcast/multicast service (MBMS) user service.

MBMS notification 235 informs the user equipments (UE) 11 about forthcoming (and potentially about ongoing) multimedia broadcast/multicast service (MBMS) broadcast data transfer. Data transfer 245 is the phase when multimedia broadcast/multicast service (MBMS) data is transferred to the user equipments (UE) 11. Session stop 255 is the point at which the multimedia broadcast/multicast service (MBMS) user service determines that there will be no more data to send for some period of time. This period is long enough to justify removal of bearer resources associated with the service. At session stop 255, the bearer resources are released. Session update (not shown) may be used to update specific parameters of an ongoing multimedia broadcast/multicast service (MBMS) broadcast session.

When compared to point-to-point communications, multicast service security faces some specific challenges. In the multimedia broadcast/multicast service (MBMS) context, ciphering has a different purpose, as multimedia broadcast/multicast service (MBMS) subscribers have no real interest in broadcast or multicast privacy. However, encryption is a key feature for operators and content providers, as it is the only way to prevent unauthorized customers from receiving the data for free.

Multimedia broadcast/multicast service (MBMS) security mechanisms like ciphering need to be designed in a way, which is suitable for point-to-multipoint communications. In addition, those mechanisms shall prevent any bypass attempts from subscribers, by exchanging keys or passwords, for example. This is the reason why multimedia broadcast/multicast service (MBMS) security mechanisms are quite specific, involving complex key structures and frequent key updates.

Figure 3:
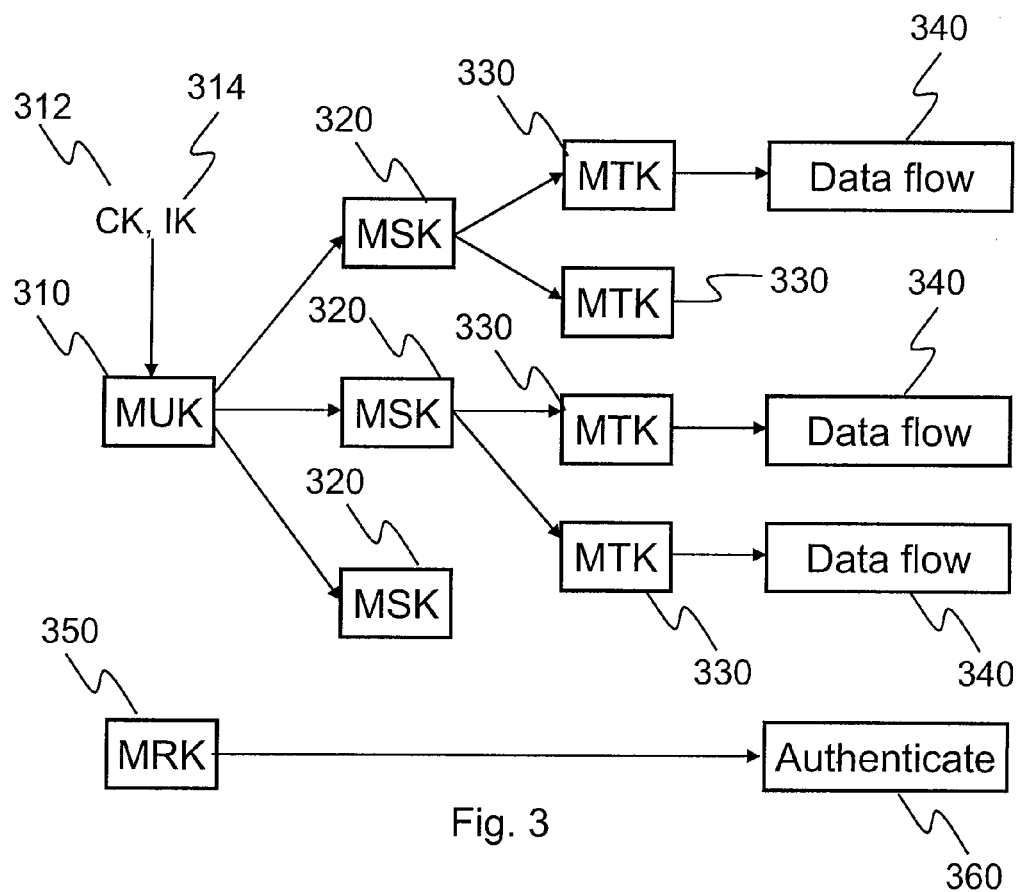
FIG. 3 illustrates key structure of the multimedia broadcast/multicast service (MBMS)

FIG. 3 illustrates key structure of the multimedia broadcast/multicast service (MBMS) security. As opposed to most point-to-point communications, the multimedia broadcast/multicast service (MBMS) security is not applied on a specific part of the transmission path (like the radio segment) but is rather performed end-to-end, between the broadcast-multicast service centre (BM-SC) 16 and the user equipments (UE) 11. The basis of the multimedia broadcast/multicast service (MBMS) security is that the multicast data are protected by a symmetric traffic key (MTK) 330 which is a secret key shared by both the sender (the broadcast-multicast service centre (BM-SC) 16) and the receivers (the multimedia broadcast/multicast service (MBMS) subscribers or user equipments (UE) 11). At first, each terminal builds its own unique secret user key (MUK) 310, derived from ciphering key (CK) 312 and integrity key (IK) 314. Ciphering key (CK) 312 and integrity key (IK) 314 may be stored in the terminal's universal subscriber identity module (USIM). Those references of ciphering key (CK) 312 and integrity key (IK) 314 are also stored within the home subscriber system (HSS) 23 so that the network can also build its own reference of the user key (MUK) 310. User key (MUK) 310 may also be generated based on sres and Kc instead of ciphering key (CK) 312 and integrity key (IK) 314. Sres is a 32-bit signed response generated by mobile station and a mobile services switching center. Kc is a 64-bit ciphering key used as a session Key for encryption of the over-the-air channel. Kc is generated by the mobile station from the random challenge presented by the global system for mobile communications (GSM) network and the Ki from the subscriber identity module (SIM) utilizing an A8 algorithm.

The user key (MUK) 310 is further used by the user equipment (UE) 11 to retrieve the service key (MSK) 320 provided by the broadcast-multicast service centre (BM-SC) 16 during the authorization process. Service key (MSK) 320 and traffic key (MTK) 330 are the actual keys to secure multimedia broadcast/multicast service (MBMS) data. Both keys are generated by the broadcast-multicast service centre (BM-SC) 16. Each traffic key (MTK) 330 corresponds to a unique data flow 340 (either a streaming flow or file download flow) and is used to cipher the data block for this flow. The set of traffic keys (MTK) 330 is transmitted to the authorized subscribers 11 by the broadcast-multicast service centre (BM-SC) 16 in a secured way, protected by the service key (MSK) 320. As a way of enhancing security, it is then possible for the broadcast-multicast service centre (BM-SC) 16 to define two different sets of service key (MSK) 320 (and associated traffic key) and update the traffic key (MTK) 330 during a service or a session by indicating to the authorized receivers 11 the new service key (MSK) 320 to use. Service key (MSK) 320 and traffic key (MTK) 330 are usually updated in a subscribers user equipment (UE) 11 using unsolicited push procedures from the broadcast-multicast service centre (BM-SC) 16. The protocol used to perform this update is multimedia internet keying (MIKEY), which is a key distribution protocol.

If a service employs the multimedia broadcast/multicast service (MBMS) security, this is indicated in the service announcement 215, 220. User equipment (UE) 11 that desires to receive such a service may first use the generic bootstrapping architecture (GBA) to establish a shared secret with the mobile network for application specific purposes. This secret is then passed by the mobile network to the broadcast-multicast service centre (BM-SC) 16. At this point the shared secret is used by both the user equipment (UE) 11 and the broadcast-multicast service centre (BM-SC) 16 to derive two user equipment (UE) 11 specific keys, the multimedia broadcast/multicast service (MBMS) request key (MRK) 350 and the multimedia broadcast/multicast service (MBMS) user key (MUK) 310. The user equipment (UE) 11 then initiates the user service registration procedure with the broadcast-multicast service centre (BM-SC) 16, during which the two parties authenticate 360 each other by using the request key (MRK) 350. If the user equipment (UE) 11 has subscribed to the service, it is registered by the broadcast-multicast service centre (BM-SC) 16 as a key recipient. The user equipment (UE) 11 then performs the service key (MSK) 320 request procedure, asking the broadcast-multicast service centre (BM-SC) 16 for the key of a specific multimedia broadcast/multicast service (MBMS) service. The broadcast-multicast service centre (BM-SC) 16 sends the multimedia broadcast/multicast service (MBMS) Service Key (MSK) to the user equipment (UE) 11 with the service key (MSK) 320 delivery procedure, using the user (MUK) 310 to protect it. The broadcast-multicast service centre (BM-SC) 16 may periodically send a new service key (MSK) 320 to the user equipment (UE) 11 to invalidate older keys.

Challenging situations may exist for the user equipment (UE) 11 relating to the key distribution. One such situation may occur when the user equipment (UE) 11 moves out of the full-covered network coverage of the multimedia broadcast/multicast service (MBMS). User may have started a multimedia broadcast/multicast service (MBMS) session when connected to network providing the multimedia broadcast/multicast service (MBMS) and during the session moving to an area, where the multimedia broadcast/multicast service (MBMS) is not served. Other possibility is that the multimedia broadcast/multicast service (MBMS) is disconnected over a mobile network for some reason and the user cannot re-connect over the mobile network. Typical situation may be when the user is sitting in a train. Critical aspect is how the key management is working when the user is watching a streamed video and getting out of the range of a good coverage area.

In accordance with an example embodiment of the invention, a handover of content distribution services between a mobile network (mobile network operator infrastructure) and a device network may be established. In order to ensure the security aspects of the multimedia broadcast/multicast service (MBMS), the cryptographic key handling needs to be created for the handover procedure. Devices of the device network may comprise for example mobile phones, personal digital assistants (PDA), laptop computers or such. The security mode concept for the handover from service covered area to not covered area may be controlled by the mobile network. The concept enables the mobile apparatus to switch between a remote and a connected security mode. The security mode concept may support both directions of handover, from the mobile network to the device network and vice versa.

In accordance with an example embodiment of the invention, the long-lived user key (MUK) 310 and the request key (MRK) 350 may not be touched due they are dependent on the generic bootstrapping architecture (GBA) and are user specific.

The short-lived traffic key (MTK) 330 is used to always decrypt the actual streaming data 340. When the user equipment (UE) 11 moves from mobile network's server covered mode to device network's peer-to-peer (P2P) mode, some problems may arise. Such problems include that the data chunks may not arrive in the right order or the data may arrive later (and the traffic key (MTK) 330 is no longer valid), for example. In the worst case, even the service key (MSK) 320 might no longer be valid (and received traffic key (MTK) 330 may no longer be decrypted). Additionally, the extension to the key management model should be compatible with the existing model and network operators, who do not wish to deploy the peer-to-peer (P2P) content distribution. The content protected with the traffic key (MTK) 330 should be exchangeable between users described to the same service.

Figure 4:
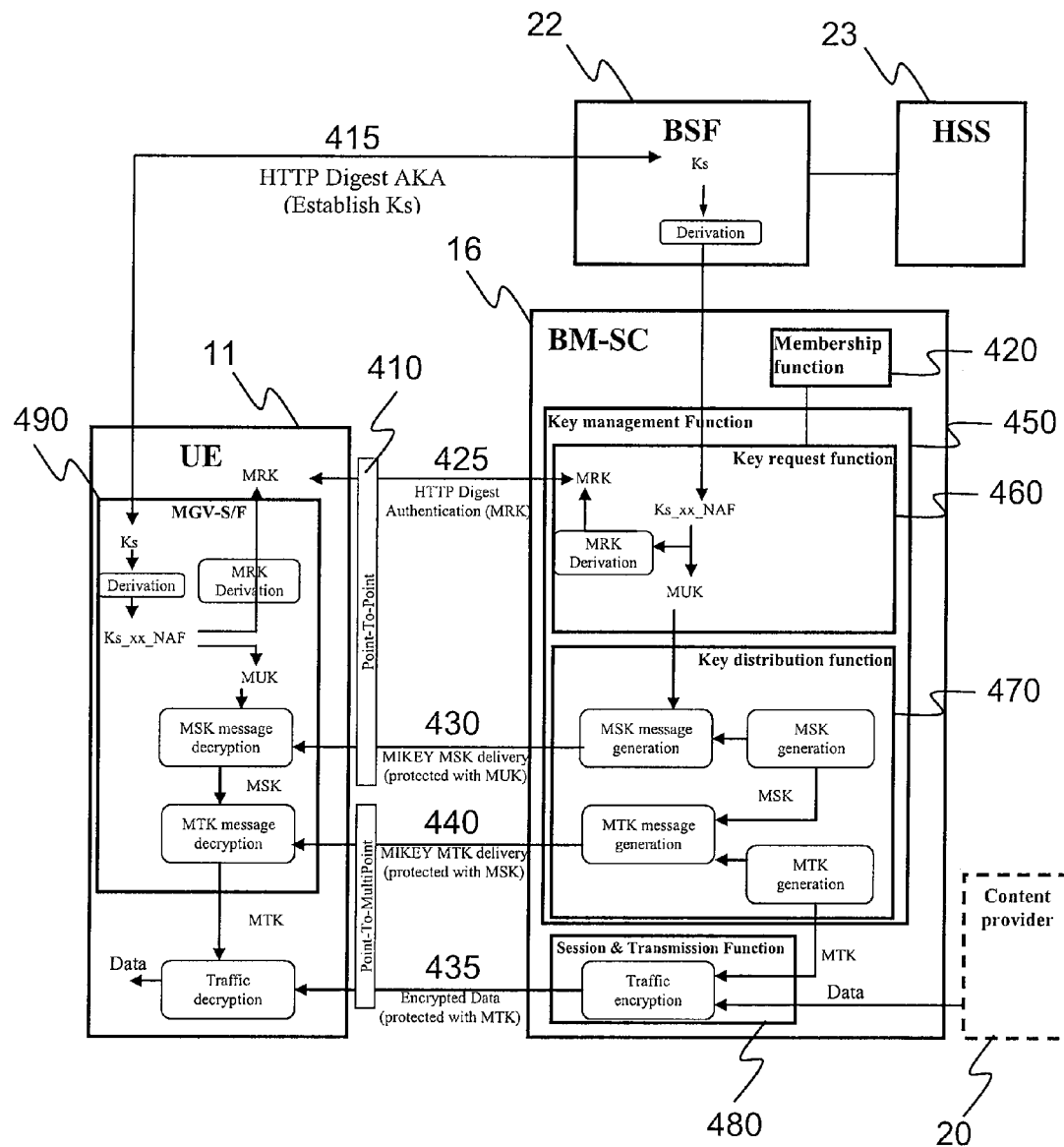
FIG. 4 shows network elements involved in the multimedia broadcast/multicast service (MBMS) from a security perspective.

FIG. 4 shows the network elements involved in the multimedia broadcast/multicast service (MBMS) from a security perspective. Nearly all the security functionality for the multimedia broadcast/multicast service (MBMS), except for the normal network bearer security, resides in either the broadcast-multicast service centre (BM-SC) 16 or the user equipment (UE) 11. Generic bootstrapping server function (BSF) 22 is a part of generic bootstrapping architecture (GBA). The user equipment (UE) 11 and the broadcast-multicast service centre (BM-SC) 16 use generic bootstrapping architecture (GBA) to establish shared keys that are used to protect the point-to-point communication 410 between the user equipment (UE) 11 and the broadcast-multicast service centre (BM-SC) 16.

The broadcast-multicast service centre (BM-SC) 16 is a source for the multimedia broadcast/multicast service (MBMS) data. It could also be responsible for scheduling data and receiving data from third parties for transmission. The broadcast-multicast service centre (BM-SC) 16 is responsible for establishing shared secrets with the user equipment (UE) 11 using generic bootstrapping architecture (GBA), authenticating the user equipment (UE) 11 with hypertext transfer protocol (HTTP) digest authentication mechanism, registering and de-registering user equipments (UE) 11 for the multimedia broadcast/multicast service (MBMS) user services, generating and distributing the keys necessary for the multimedia broadcast/multicast service (MBMS) security to the user equipments (UE) 11 with multimedia internet keying (MIKEY) protocol and for applying the appropriate protection to data that is transmitted as part of a the multimedia broadcast/multicast service (MBMS) user service. The broadcast-multicast service centre (BM-SC) 16 also provides the multimedia broadcast/multicast service (MBMS) bearer authorization for the user equipments (UE) 11 attempting to establish the multimedia broadcast/multicast service (MBMS) bearer.

The broadcast-multicast service centre (BM-SC) 16 also verifies whether a user is authorized to register and receive keys for the multimedia broadcast/multicast service (MBMS) user service. For the multimedia broadcast/multicast service (MBMS) multicast mode this authorization is done with the help of membership function 420 in the broadcast-multicast service centre (BM-SC) 16. For the multimedia broadcast/multicast service (MBMS) broadcast mode this authorization is done without the help of membership function 420 because the membership function 420 is only defined in the context of the multimedia broadcast/multicast service (MBMS) multicast mode.

The user equipment (UE) 11 is responsible for establishing shared secrets with the broadcast-multicast service centre (BM-SC) 16 using generic bootstrapping architecture (GBA), registering to and de-registering from the multimedia broadcast/multicast service (MBMS) user services, requesting and receiving keys for the multimedia broadcast/multicast service (MBMS) user service from the broadcast-multicast service centre (BM-SC) 16 and also using those keys to decrypt the multimedia broadcast/multicast service (MBMS) data that is received.

Key management function 450 includes two sub-functions: Key request function 460 and key distribution function 470. The key request function 460 is responsible for retrieving generic bootstrapping architecture (GBA) keys (for example session key Ks derived from ciphering key (CK) and integrity key (IK)) from the bootstrapping function (BSF), deriving user key (MUK) and request key (MRK) from generic bootstrapping architecture (GBA) keys and performing multimedia broadcast/multicast service (MBMS) user service registration, deregistration and service key (MSK) request procedures and related user authentication using request key (MRK). Furthermore, key request function 460 is responsible for providing user key (MUK) to key distribution function and performing authorization check. Key distribution function 470 is responsible for retrieving user key (MUK) from key request function 460, generating and distributing service keys (MSK) and traffic keys (MTK) to the user equipment (UE) 11 and providing traffic key (MTK) to session and transmission function 480.

Session and transmission function 480 is responsible for session and transmission functions. A content provider 20 may provide data for the session and transmission function 480. The session and transmission function 480 may perform protection of data with traffic key (MTK) including encryption and/or integrity protection. The encrypted data 435 may be sent to user equipment (UE) 11 for decryption.

The user equipment (UE) 11 may include a secure generation and validation storage (MGV-S) 490. The generation and validation storage (MGV-S) 490 may be realized in the user equipment (UE) 11 or in the universal integrated circuit card (UICC). The generation and validation storage (MGV-S) 490 is implemented in a protected execution environment to prevent leakage of security sensitive information such as multimedia broadcast/multicast service (MBMS) keys. The generation and validation storage (MGV-S) 490 stores the multimedia broadcast/multicast service (MBMS) keys and the generation and validation storage (MGV-S) 490 performs the functions that should not be exposed to unprotected parts of the user equipment (UE) 11.

Hypertext transfer protocol (HTTP) digest authentication and key agreement (AKA) procedure 415 may be run between user equipment (UE) 11 and a bootstrapping function (22). As a result, shared secret session keys Ks are generated to both ends. Shared secret session key Ks may be generated by concatenating ciphering key (CK) 312 and integrity key (IK) 314 as referred in FIG. 3. Furthermore, shared secret session key Ks may be used for deriving a key Ks_xx_NAF. Derived key Ks_xx_NAF may be used as a user key (MUK) in both the generation and validation storage (MGV-S) 490 of the user equipment (UE) 11 and the key management function 450 of the broadcast-multicast service centre (BM-SC) 16.

The user equipment (UE) 11 may initiate the user service registration procedure with the broadcast-multicast service centre (BM-SC) 16, during which the two parties authenticate each other by using the request key (MRK) and hypertext transfer protocol (HTTP) digest authentication 425. If the user equipment (UE) 11 has subscribed to the service, the user equipment (UE) 11 is registered by the broadcast-multicast service centre (BM-SC) 16 as a key recipient. The user equipment (UE) 11 then performs the service key (MSK) request procedure, asking the broadcast-multicast service centre (BM-SC) 16 for the key of a specific multimedia broadcast/multicast service (MBMS) service. The broadcast-multicast service centre (BM-SC) 16 sends the multimedia broadcast/multicast service (MBMS) Service Key (MSK) to the user equipment (UE) 11 with the service key (MSK) delivery procedure 430, using the user (MUK) to protect it. The set of traffic keys (MTK) is transmitted to the authorized user equipment (UE) 11 by the broadcast-multicast service centre (BM-SC) 16 in a secured way 440, protected by the service key (MSK).

In accordance with an example embodiment of the invention, the key lifetime of the traffic key (MTK) 330 may be extended. On the other hand, the content of a data flow 340 might be consumed much later then the actual initial encryption and hence the key might need to be valid a long time. For off-coverage mode, the network operator might be willing to relax the key management system. However, when the user equipment (UE) 11 is in a densely populated area, the operator is much more likely to desire a strong security model. In addition, operators may wish that some users are allowed to go into peer-to-peer (P2P) security mode, for example users that have yearlong high level service contracts. Roaming may also be an option for not allowing the user equipment (UE) 11 to switch peer-to-peer (P2P) mode.

In accordance with an example embodiment of the invention, no changes are intended to the service key (MSK) 320 key management hence no changes to the smart card or the interface to the smart card are intended. The changes may only affect the traffic key (MTK) 330 and usage, storage and deletion of it. The changes may also affect directly traffic key (MTK) 330 related data (like key identifier and sequence number). The traffic key (MTK) 330 may be handled in the user equipment (UE) 11 only, not in the universal integrated circuit card (UICC).

In accordance with an example embodiment of the invention, there are some factors allowing user equipment (UE) 11 to switch into peer-to-peer (P2P) security mode. First, the user equipment (UE) 11 is connected to a border server of the streaming network (network indication may be given of that fact). Second, the user equipment (UE) 11 receives an indication from the network application function (NAF) that the user equipment (UE) 11 is allowed to switch to peer-to-peer (P2P) security mode. Third, mobile network signal strength of the user equipment (UE) 11 goes down. The first two factors may be the same, in the sense, that only border servers may send the indication.

When the signal strength goes down and the network has allowed the switching, the user equipment (UE) 11 may switch to peer-to-peer (P2P) security mode. However, lifetime of the traffic key (MTK) 330 is quite short and when the signal strength of the user equipment (UE) 11 goes down, the allowed window of traffic keys (MTK) 330 and their lifetime need to be extended. In addition, the allowed window for sequence numbers needs to be extended.

In accordance with an example embodiment of the invention, a replay counter is extended for the multimedia internet keying (MIKEY) message 430, 440 arriving at the user equipment (UE) 11. Extension payload is examined for the received multimedia internet keying (MIKEY) message 430, 440, and if the extension payload indicates a traffic key (MTK) delivery message 440 protected with service key (MSK) 320, the service key (MSK) identifier is extracted from the extension payload. After that the timestamp payload is checked, and the message 430, 440 is discarded if the counter in the timestamp payload is smaller or equal to the stored replay counter associated with the given service key (MSK) 320. The stored replay counter value is retrieved from a generation and validation storage (MGV-S) of the user equipment (UE) 11. When extending the replay counter, the payload may be used for a longer period of time for peer-to-peer (P2P) security mode. If the traffic key (MTK) identifier extracted from the extension payload is less than or equal to the current traffic key (MTK) identifier, the message shall be discarded. Allowing the extracted traffic key (MTK) identifier to be higher than the current traffic key (MTK) identifier also improves the peer-to-peer (P2P) security mode. The multimedia internet keying (MIKEY) message 430, 440 is next transported to a generation and validation function (MGV-F) for further processing. The generation and validation function (MGV-F) replies with success or failure.

In accordance with an example embodiment of the invention, when the generation and validation function (MGV-F) receives the multimedia internet keying (MIKEY) message 430, 440, the generation and validation function (MGV-F) first determines the type of message by reading the extension payload. If the extension payload indicates a traffic key (MTK) delivery 440 then the generation and validation function (MGV-F) retrieves the service key (MSK) 320 with the identifier given by the extension payload.

The service specific data, service key (MSK) 320, a random number and sequence numbers SEQI and SEQu, have been stored within a secure storage in the generation and validation storage (MGV-S). Sequence number SEQI corresponds to last accepted traffic key (MTK) identifier interval stored within the generation and validation storage (MGV-S). The original value of SEQI is delivered in the key validity data field of service key (MSK) messages 430. Sequence number SEQu corresponds to upper limit of the traffic key (MTK) identifier sequence number interval, which is delivered in the key validity data field of service key (MSK) messages 430. Service key (MSK) 320, SEQI and SEQu are transferred to the generation and validation storage (MGV-S) with the execution of the service key (MSK) update procedures. The initial values of SEQI and SEQu may be determined by the service provider.

The generation and validation function (MGV-F) may compare the received traffic key (MTK) identifier from the multimedia internet keying (MIKEY) message 430, 440 with the stored sequence numbers SEQI and SEQu. If the received traffic key (MTK) identifier is equal to or lower than SEQI or the received traffic key (MTK) identifier is greater than SEQu, then the generation and validation function (MGV-F) shall indicate a failure to the user equipment (UE) 11. However, if the peer-to-peer (P2P) security mode is used, a failure to the user equipment (UE) 11 is not indicated in case the received traffic key (MTK) identifier is greater than SEQu.

The user equipment (UE) 11 may store the two most recent traffic keys (MTK) 330 used per multimedia broadcast/multicast service (MBMS) streaming or download session. In particular, if the generation and validation function (MGV-F) receives a traffic key (MTK) 330 and already stores two other traffic keys (MTK) 330 for that multimedia broadcast/multicast service (MBMS) streaming or download session, then the user equipment (UE) 11 shall keep the newer and delete the older of the two stored traffic keys (MTK) 330 before storing the received traffic key (MTK) 330. Any traffic key (MTK) 330 stored in association with a particular multimedia broadcast/multicast service (MBMS) streaming or download session should be deleted at the end of that session. For peer-to-peer (P2P) security mode, the user equipment (UE) 11 may keep the two stored traffic keys (MTK) 330 to improve the decryption of older service session. Also the keeping the traffic keys (MTK) 330 in association with a particular broadcast/multicast service (MBMS) streaming or download session after the end of the session may be carried out for similar purposes.

In accordance with an example embodiment of the invention, the generic bootstrapping architecture user security settings (GUSS) stored in the home subscriber server (HSS) 23 contains a field, which indicate, that the peer-to-peer (P2P) security mode is allowed for certain user and certain network application function (NAF). The network application function (NAF) is configured to request generic bootstrapping architecture user security settings (GUSS). A border server network application function (NAF) extracts the security settings information and sends the information along with the streamed data to the user equipment (UE) 11. For example, the border server network application function (NAF) may attach an indication after the traffic key (MTK) 330 and encrypt all with service key (MSK) 320. Legacy terminal not supporting peer-to-peer (P2P) security mode may just ignore the indication and remain in the normal security mode.

When the mobile network signal strength goes down, the user equipment (UE) 11 may then collect streaming data from other devices. Since the traffic key (MTK) 330 is the same for all users subscribed to the service, the user equipment (UE) 11 is able to decrypt the data.

If the signal strength goes up again, the user equipment (UE) 11 may no longer need the data from other devices and the security mode can be set from the peer-to-peer (P2P) to normal again.

If the network application function (NAF) does not support peer-to-peer (P2P) security mode, then the network application function (NAF) may just ignore the generic bootstrapping architecture user security settings (GUSS) field. This feature may provide backward compatibility and compatibility with city-nodes (not border nodes).

In accordance with an example embodiment of the invention, the user equipment (UE) 11 may request old traffic keys (MTK) 330 from the border server network application function (NAF) in peer-to-peer (P2P) security mode.

Peer-to-peer (P2P) security mode may generate an addition of device features may allow streaming services in areas, where for return-of-investment reasons streaming service would not be possible.

Figure 5:
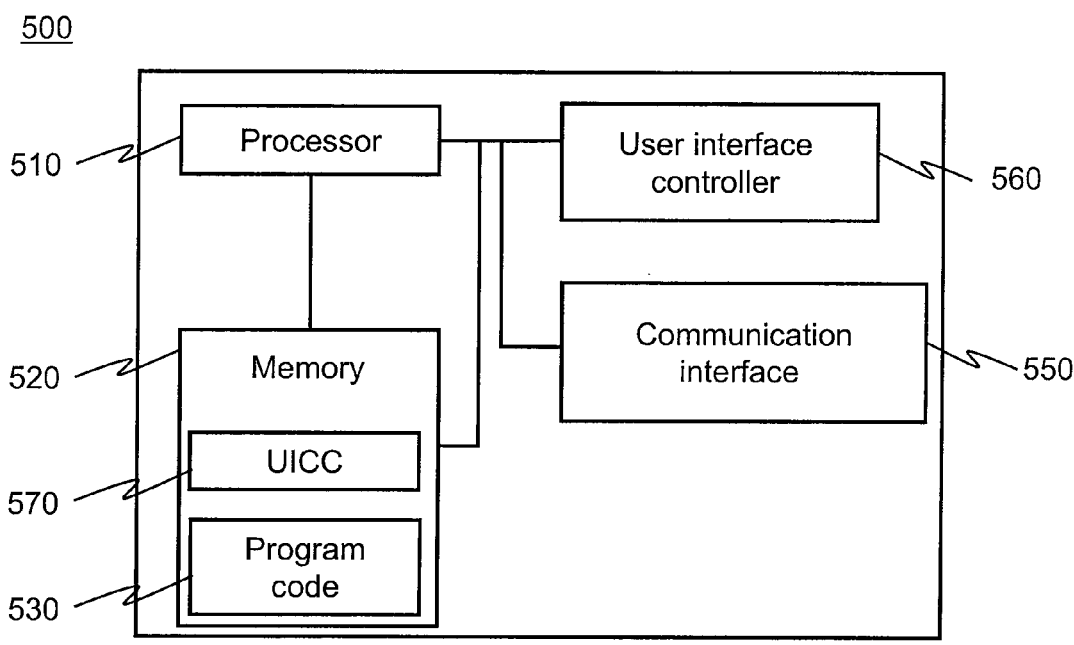
FIG. 5 presents an example block diagram of an apparatus in which various embodiments of the invention may be applied.

FIG. 5 presents an example block diagram of an apparatus 500 in which various embodiments of the invention may be applied. This may be a user equipment (UE), user device or apparatus, such as a mobile terminal or other communication device.

The general structure of the apparatus 500 comprises a communication interface module 550, a processor 510 coupled to the communication interface module 550, and a memory 520 coupled to the processor 510. The apparatus further comprises software 530 stored in the memory 520 and operable to be loaded into and executed in the processor 510. The software 530 may comprise one or more software modules and can be in the form of a computer program product. The apparatus 500 further comprises a user interface controller 560 coupled to the processor 510.

The communication interface module 550 implements at least part of the user data radio discussed in connection with various embodiments of the invention. The communication interface module 550 may be, e.g., a radio interface module, such as a WLAN, Bluetooth, GSM/GPRS, CDMA, WCDMA, or LTE (Long Term Evolution) radio module. The communication interface module 550 may be integrated into the apparatus 500 or into an adapter, card or the like that may be inserted into a suitable slot or port of the apparatus 500. The communication interface module 550 may support one radio interface technology or a plurality of technologies. FIG. 5 shows one communication interface module 550, but the apparatus 500 may comprise a plurality of communication interface modules 550.

The processor 510 may be, e.g., a central processing unit (CPU), a microprocessor, a digital signal processor (DSP), a graphics processing unit, or the like. FIG. 5 shows one processor 510, but the apparatus 500 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 500 may comprise a plurality of memories.

The memory 520 may be constructed as a part of the apparatus 500 or it may be inserted into a slot, port, or the like of the apparatus 500 by a user. The memory 520 may serve the sole purpose of storing data, or it may be constructed as a part of an apparatus serving other purposes, such as processing data.

A universal integrated circuit card (UICC) 570 may be included as a smart card used in the apparatus 500. The universal integrated circuit card (UICC) 570 ensures the integrity and security of certain personal data. The universal integrated circuit card (UICC) 570 may contain its unique serial number, internationally unique number of the mobile user (IMSI), security authentication and ciphering information, temporary information related to the local network, a list of the services the user has access to and passwords (PIN for usual use and PUK for unlocking). The universal integrated circuit card (UICC) 570 may further comprise several applications, making it possible for the same smart card to give access to different networks, and also provide storage of a phone book and other applications. The system may utilize a embedded security module for the key storage and processing.

The user interface controller 560 may comprise circuitry for receiving input from a user of the apparatus 500, e.g., via a keyboard, graphical user interface shown on the display of the apparatus 500, speech recognition circuitry, or an accessory device, such as a headset, and for providing output to the user via, e.g., a graphical user interface or a loudspeaker.

A skilled person appreciates that in addition to the elements shown in FIG. 5, the apparatus 500 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 500 may comprise a disposable or rechargeable battery (not shown) for powering the apparatus 500 when external power if external power supply is not available.

Figure 6:
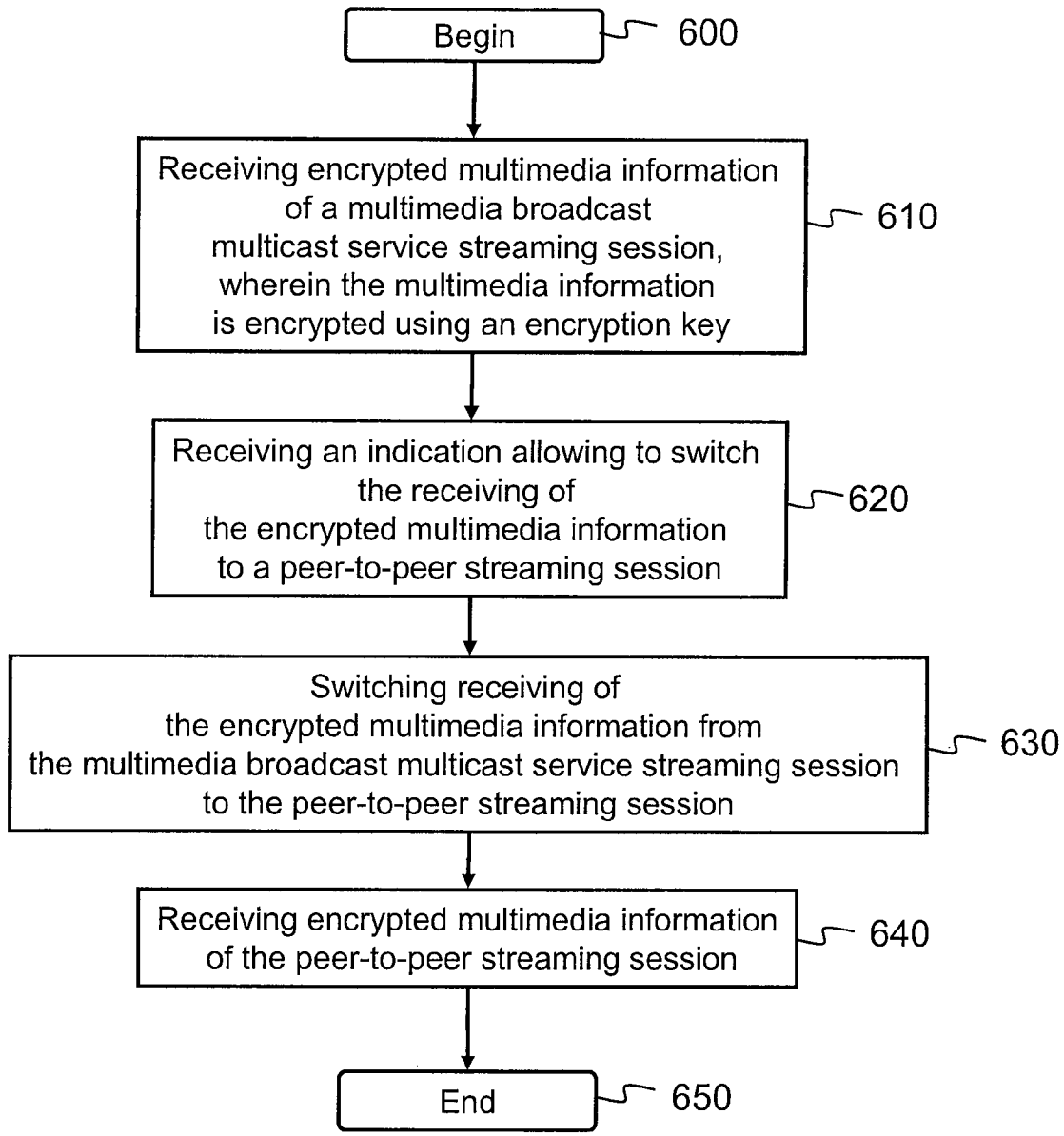
FIG. 6 shows a flow diagram showing peer-to-peer streaming session operations in an apparatus in accordance with an example embodiment of the invention.

FIG. 6 shows a flow diagram showing peer-to-peer streaming session operations in an apparatus in accordance with an example embodiment of the invention. In step 600, the method is started. In step 610, encrypted multimedia information of a multimedia broadcast multicast service streaming session is received, wherein the multimedia information is encrypted using an encryption key. In step 620, an indication allowing to switch the receiving of the encrypted multimedia information to a peer-to-peer streaming session is received. In step 630, receiving of the encrypted multimedia information from the multimedia broadcast multicast service streaming session to the peer-to-peer streaming session is switched. In step 640, encrypted multimedia information of the peer-to-peer streaming session is received. The method ends in step 650.

The deployment of expensive streaming services in sparsely populated areas may not be efficient for a network operator. However, such areas should also be covered by the service infrastructure. An embodiment of the invention presents a method to extend the existing network technology to enable and support direct user equipment (UE) interaction to provide media services in such areas.

A similar technology has been adopted by the Open Mobile Alliance (OMA) in their OMA Broadcast (OMA BOAST) specifications. Their security model and key hierarchy are analogous to the multimedia broadcast/multicast service (MBMS) security architecture. Thus, the embodiments of the invention also apply to the Open Mobile Alliance (OMA) environment.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising:
receiving at an apparatus, inside a multimedia broadcast multicast streaming service coverage area of a first access point of a wide-area network, encrypted multimedia information from a multimedia broadcast multicast service streaming session, wherein the multimedia information is encrypted using an encryption key and is received from the first access point of the wide-area network;
receiving, at said apparatus, from the wide-area network, an indication that a handover of the receiving of the encrypted multimedia information from the first access point of the wide-area network to a service area remnant peer-to-peer streaming session conduit is allowed by the wide-area network;
switching, at said apparatus, receiving of the encrypted multimedia information from the first access point of the wide-area network to receiving of the encrypted multimedia information via the service area remnant peer-to-peer streaming session conduit; and
receiving at said apparatus, outside said multimedia broadcast multicast streaming service coverage area of said first access point of the wide-area network, after said handover, the encrypted multimedia information indirectly from the first access point of the wide-area network, wherein said indirect receipt is from inside said multimedia broadcast multicast streaming service coverage area of the first access point of the wide-area network via said service area remnant peer-to-peer streaming session conduit.

2. The method of claim 1, further comprising:
receiving a protected service key and the encryption key, wherein the encryption key is protected by the service key before switching of the receiving of the encrypted multimedia information to receiving of the encrypted multimedia information via the service area remnant peer-to-peer streaming session conduit.

3. The method of claim 2, further comprising:
decrypting the multimedia information using the encryption key.

4. The method of claim 2, further comprising:
generating a user key;
unprotecting the protected service key using the user key;
unprotecting the protected encryption key using the unprotected service key; and
decrypting the multimedia information using the encryption key.

5. The method of claim 4, wherein the user key is derived from a ciphering key and an integrity key.

6. The method of claim 1, wherein the switching of the receiving of the encrypted multimedia information to receiving of the encrypted multimedia information via the service area remnant peer-to-peer streaming session conduit is triggered in response to at least one of the following criteria:
losing the broadcast multicast service streaming session;
load balancing by mobile network operator.

7. The method of claim 1, wherein the multimedia information comprises real-time streaming data or file download data.

8. The method of claim 1, further comprising:
determining a lifetime of a time period for the encryption key during which time period the encryption key is valid for data decryption.

9. The method of claim 8, further comprising:
extending the lifetime of the encryption key for the peer-to-peer streaming session.

10. The method of claim 8, further comprising:
switching back from the peer-to-peer streaming session to the multimedia broadcast multicast service streaming session.

11. An apparatus comprising:
at least one processor; and
at least one memory including computer program code, the at least one memory and the computer program code being configured to, with the at least one processor, cause the apparatus at least to perform:
receive, inside a multimedia broadcast multicast streaming service coverage area of a first access point of a wide-area network, encrypted multimedia information from a multimedia broadcast multicast service streaming session, wherein the multimedia information is encrypted using an encryption key and is received from the first access point of the wide-area network;
receive from the wide-area network an indication that a handover of the receiving of the encrypted multimedia information from the first access point of the wide-area network to a service area remnant peer-to-peer streaming session conduit is allowed by the wide-area network;
switch receiving of the encrypted multimedia information from the first access point of the wide-area network to receiving of the encrypted multimedia information via the service area remnant peer-to-peer streaming session conduit; and
receive, outside said multimedia broadcast multicast streaming service coverage area of said first access point of the wide-area network, after said handover, the encrypted multimedia information indirectly from the first access point of the wide-area network, wherein said indirect receipt is from inside said multimedia broadcast multicast streaming service coverage area of the first access point of the wide-area network via said service area remnant peer-to-peer streaming session conduit.

12. The apparatus of claim 11, wherein the at least one memory and the computer program code configured to, with the at least one processor, cause the apparatus to further perform:
receive a service key and the encryption key, wherein the encryption key is protected by the service key before switching of the receiving of the encrypted multimedia information to receiving of the encrypted multimedia information via the service area remnant peer-to-peer streaming session conduit.

13. The apparatus of claim 12, wherein the at least one memory and the computer program code configured to, with the at least one processor, cause the apparatus to further perform:
decrypt the multimedia information using the encryption key.

14. The apparatus of claim 12, wherein the at least one memory and the computer program code configured to, with the at least one processor, cause the apparatus to further perform:
derive encryption key from the protected encryption key by the service key.

15. A computer program embodied on a computer readable non-transitory medium comprising computer executable program code which, when executed by at least one processor of an apparatus, causes the apparatus to perform:
receive, inside a multimedia broadcast multicast streaming service coverage area of a first access point of a wide area network, encrypted multimedia information from a multimedia broadcast multicast service streaming session, wherein the multimedia information is encrypted using an encryption key and is received from the first access point of the wide-area network;
receive from the wide-area network an indication that a handover of the receiving of the encrypted multimedia information from the first access point of the wide area network to a service area remnant peer-to-peer streaming session conduit is allowed by the wide-area network;
switch receiving of the encrypted multimedia information from the first access point of the wide area network to receiving of the encrypted multimedia information via the service area remnant peer-to-peer streaming session conduit; and
receive, outside said multimedia broadcast multicast streaming service coverage area of said first access point of the wide area network, after said handover, the encrypted multimedia information indirectly from the first access point of the wide-area network, wherein said indirect receipt is from inside said multimedia broadcast multicast streaming service coverage area of the first access point of the wide-area network via said service area remnant peer-to-peer streaming session conduit.

\* \* \* \* \*